United States Patent
Lee et al.

(10) Patent No.: US 10,231,252 B2
(45) Date of Patent: Mar. 12, 2019

(54) METHOD AND APPARATUS FOR PRIORITIZING DEVICE-TO-DEVICE RECEPTION OVER MBMS RECEPTION IN WIRELESS COMMUNICATION SYSTEM

(71) Applicant: LG ELECTRONICS INC., Seoul (KR)

(72) Inventors: Youngdae Lee, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 26 days.

(21) Appl. No.: 15/512,783

(22) PCT Filed: Sep. 25, 2015

(86) PCT No.: PCT/KR2015/010161
§ 371 (c)(1),
(2) Date: Mar. 20, 2017

(87) PCT Pub. No.: WO2016/048083
PCT Pub. Date: Mar. 31, 2016

(65) Prior Publication Data
US 2017/0303297 A1    Oct. 19, 2017

Related U.S. Application Data

(60) Provisional application No. 62/055,599, filed on Sep. 25, 2014.

(51) Int. Cl.
*H04W 4/08* (2009.01)
*H04W 40/24* (2009.01)
(Continued)

(52) U.S. Cl.
CPC ..... *H04W 72/1242* (2013.01); *H04L 45/7453* (2013.01); *H04W 4/08* (2013.01);
(Continued)

(58) Field of Classification Search
CPC ............ H04B 7/18528; H04B 7/18571; H04B 7/18576; H04B 7/18541; H04W 84/06;
(Continued)

(56) References Cited

U.S. PATENT DOCUMENTS 9,924,503 B2 * 3/2018 Kim ...................... H04W 8/005
2009/0163189 A1 * 6/2009 Gil .................... G06F 17/30896
455/414.3

(Continued)

FOREIGN PATENT DOCUMENTS

WO    WO 2014/050556 A1    4/2014
WO    WO 2014/058221 A2    4/2014

OTHER PUBLICATIONS

LG Electronics Inc., "Prioritized reselection of D2D supported frequency", 3GPP TSG-RAN WG2 #87, Dresden, Germany, Aug. 18-22, 2014, pp. 1-3.

(Continued)

*Primary Examiner* — Sharad Rampuria
(74) *Attorney, Agent, or Firm* — Birch, Stewart, Kolasch & Birch, LLP

(57) ABSTRACT

A method and apparatus for prioritizing one of a multimedia broadcast multicast service (MBMS) reception or a device-to-device (D2D) reception in a wireless communication system is provided. A user equipment (UE) prioritizes one of the MBMS reception or the D2D reception when the UE cannot support both the MBMS reception and the D2D reception simultaneously, and indicates a result of the prioritization to a network. The result of the prioritization indicates either that the MBMS reception is prioritized over the D2D reception or the D2D reception is prioritized over the MBMS reception.

12 Claims, 4 Drawing Sheets

(51) Int. Cl.
*H04W 72/00* (2009.01)
*H04W 72/04* (2009.01)
*H04W 72/12* (2009.01)
*H04L 12/743* (2013.01)

(52) U.S. Cl.
CPC ....... *H04W 40/244* (2013.01); *H04W 40/246* (2013.01); *H04W 72/005* (2013.01); *H04W 72/042* (2013.01); *H04W 72/0413* (2013.01); *H04W 72/1284* (2013.01)

(58) Field of Classification Search
CPC ............. H04W 36/00; H04W 36/0005; H04W 36/0016; H04W 84/04; H04W 88/06; H04L 47/767; H04L 12/4604
See application file for complete search history.

(56) References Cited

U.S. PATENT DOCUMENTS

| | | | |
|---|---|---|---|
| 2012/0195251 A1* | 8/2012 | Guo | H04L 12/189 370/312 |
| 2015/0257184 A1* | 9/2015 | Yamazaki | H04W 76/14 370/329 |
| 2016/0044634 A1* | 2/2016 | Seo | H04W 76/14 370/312 |
| 2018/0132297 A1* | 5/2018 | Li | H04W 72/04 |

OTHER PUBLICATIONS

Samsung, "Power prioritization for D2D and WAN CA", 3GPP TSG RAN WG1 #78, Dresden, Germany, Aug. 18-22, 2014, pp. 1-2.
ZTE, "On D2D UE capability, D2D interest and prioritization", 3GPP TSG-RAN WG2 Meeting #87, Dresden, Germany, Aug. 18-22, 2014, pp. 1-6.

* cited by examiner

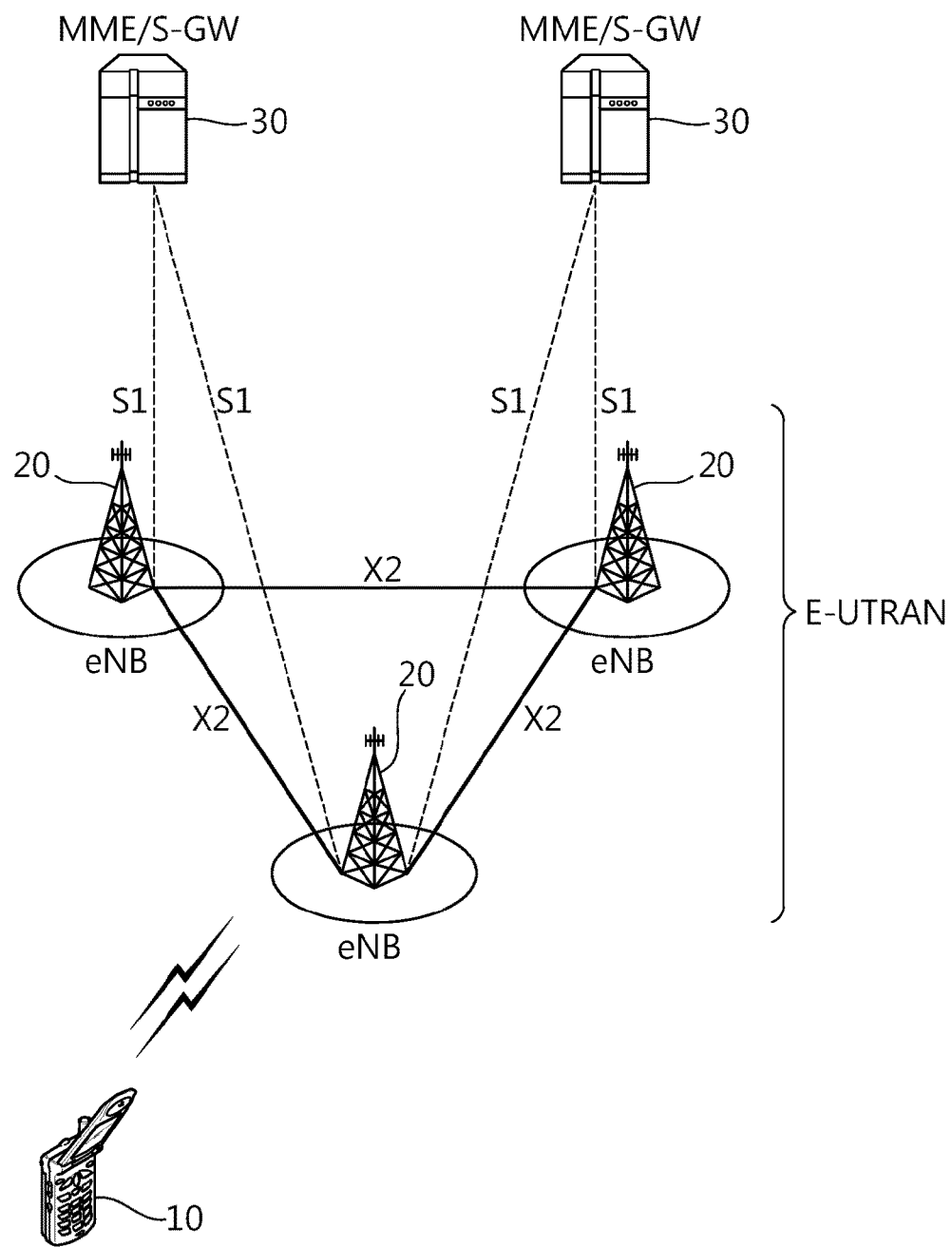
[Fig. 1]

[Fig. 2]
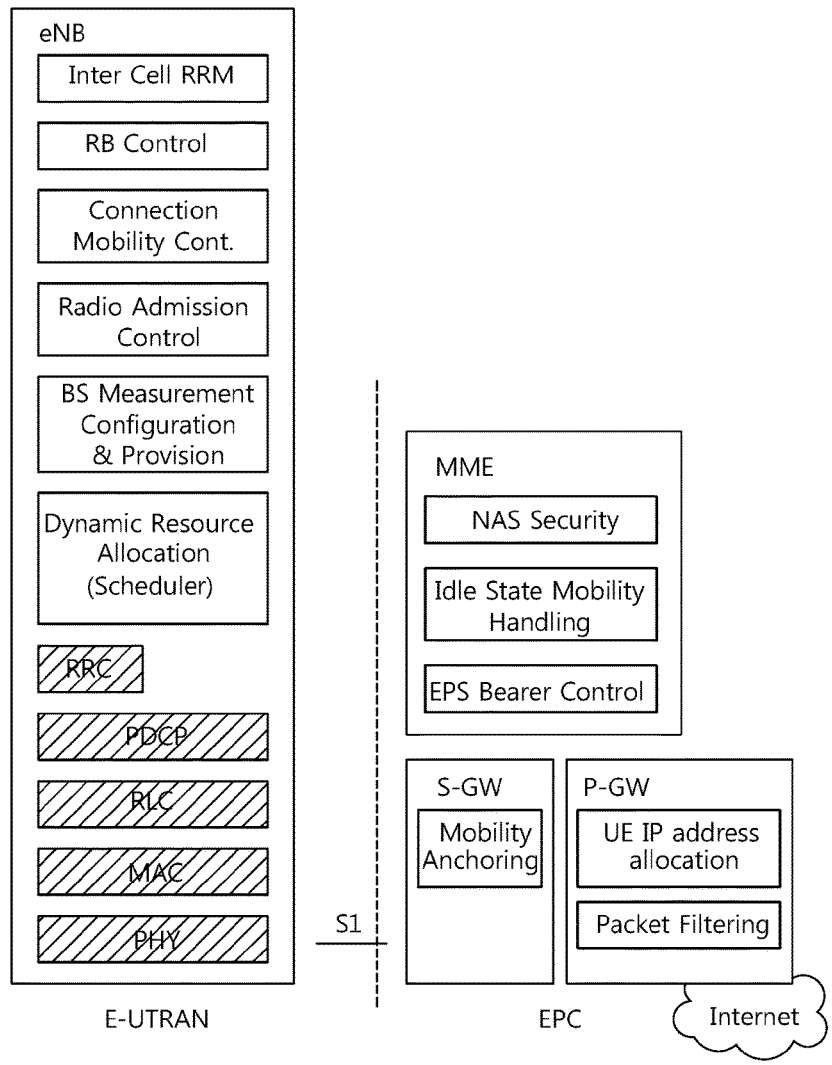
[Fig. 3]
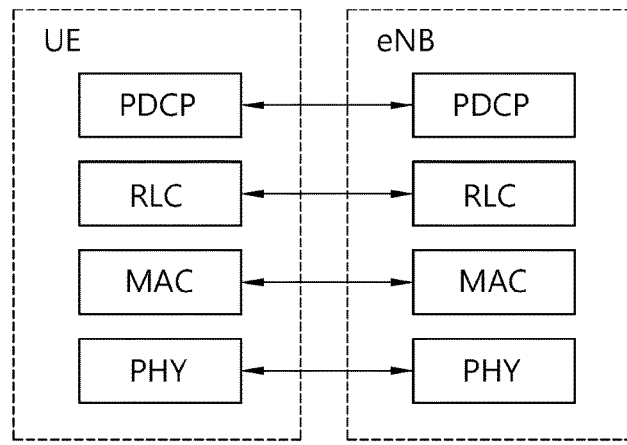

[Fig. 4]
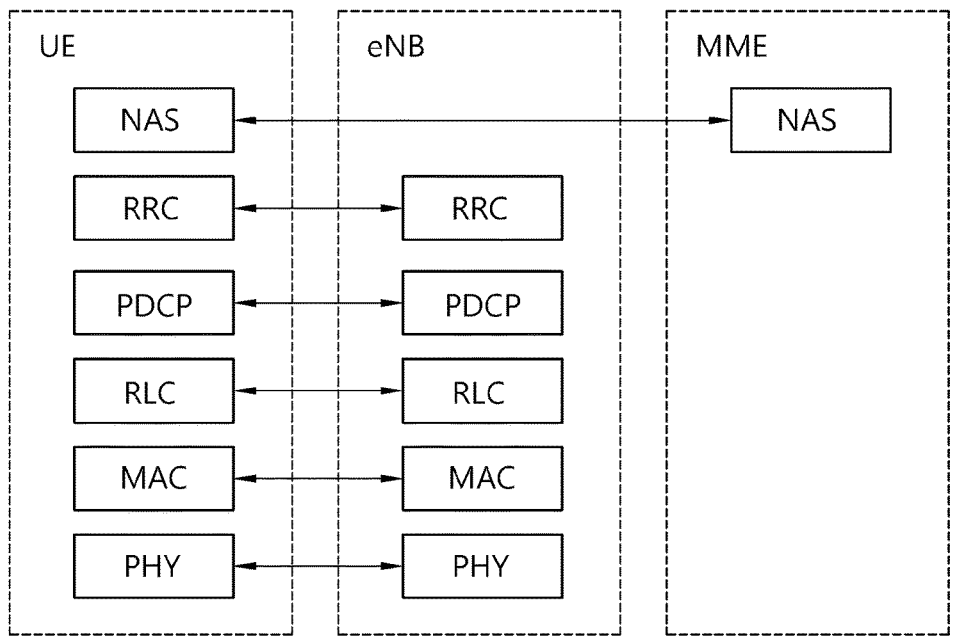
[Fig. 5]
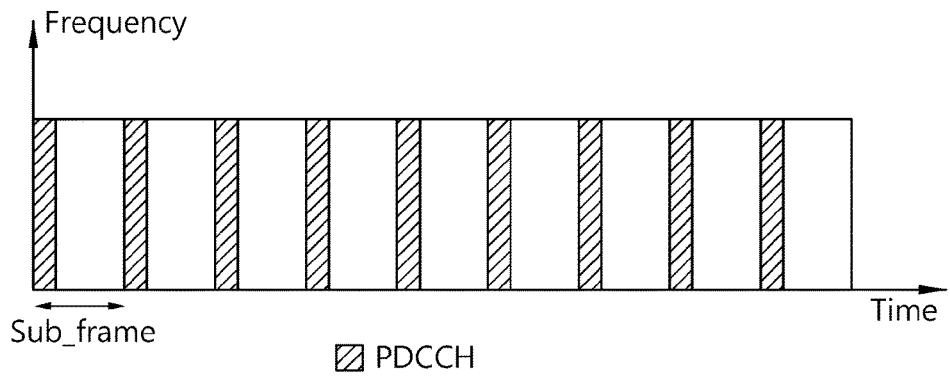
[Fig. 6]
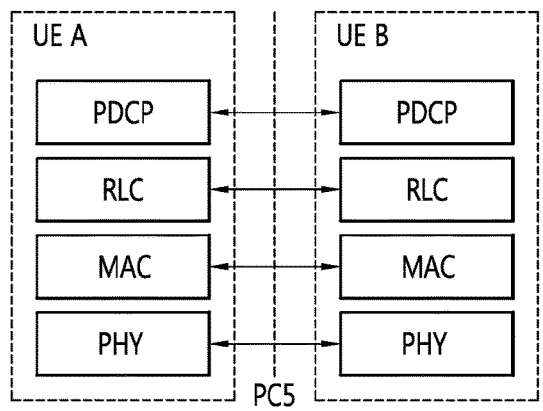

[Fig. 7]
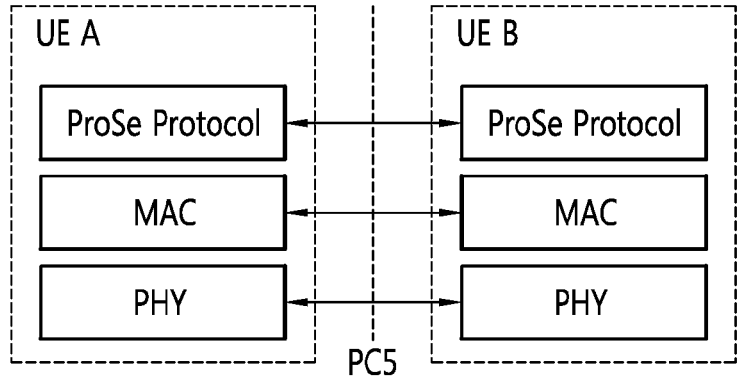
[Fig. 8]
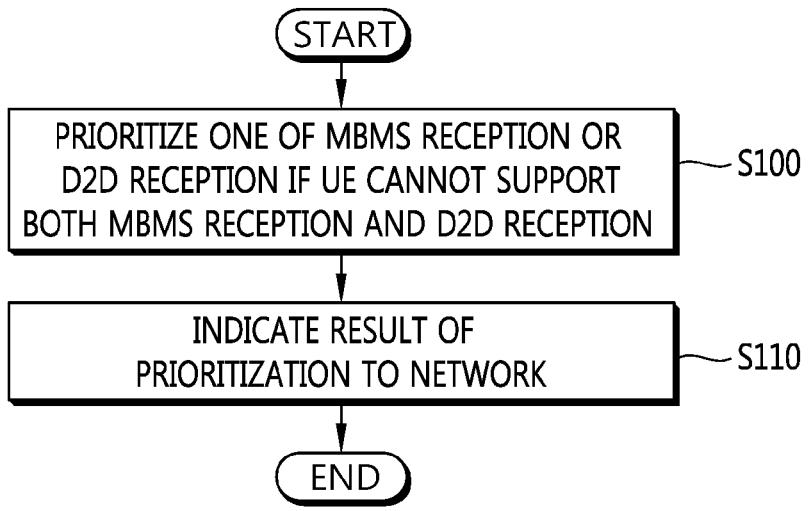
[Fig. 9]
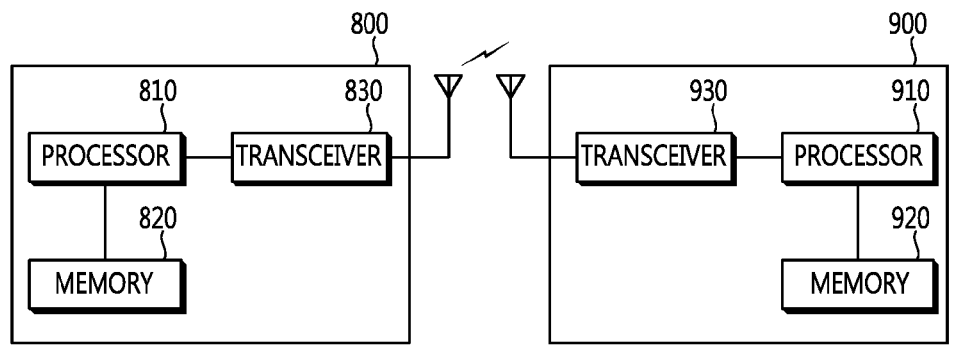

METHOD AND APPARATUS FOR PRIORITIZING DEVICE-TO-DEVICE RECEPTION OVER MBMS RECEPTION IN WIRELESS COMMUNICATION SYSTEM

CROSS REFERENCE TO RELATED APPLICATIONS

This application is the National Phase of PCT International Application No. PCT/KR2015/010161, filed on Sep. 25, 2015, which claims priority under 35 U.S.C. 119(e) to U.S. Provisional Application No. 62/055,599, filed on Sep. 25, 2014, all of which are hereby expressly incorporated by reference into the present application.

TECHNICAL FIELD

The present invention relates to wireless communications, and more particularly, to a method and apparatus for prioritizing a device-to-device (D2D) reception over a multimedia broadcast multicast service (MBMS) reception in a wireless communication system.

BACKGROUND ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

The 3GPP LTE may provide a multimedia broadcast multicast service (MBMS) service. The MBMS is a service which simultaneously transmits data packets to multiple users. If a specific level of users exists in the same cell, the respective users can be allowed to share necessary resources so that the plurality of users can receive the same multimedia data, thereby increasing resource efficiency. In addition, a multimedia service can be used with a low cost from the perspective of users.

Recently, there has been a surge of interest in supporting proximity-based services (ProSe). Proximity is determined ("a user equipment (UE) is in proximity of another UE") when given proximity criteria are fulfilled. This new interest is motivated by several factors driven largely by social networking applications, and the crushing data demands on cellular spectrum, much of which is localized traffic, and the under-utilization of uplink frequency bands. 3GPP is targeting the availability of ProSe in LTE rel-12 to enable LTE become a competitive broadband communication technology for public safety networks, used by first responders. Due to the legacy issues and budget constraints, current public safety networks are still mainly based on obsolete 2G technologies while commercial networks are rapidly migrating to LTE. This evolution gap and the desire for enhanced services have led to global attempts to upgrade existing public safety networks. Compared to commercial networks, public safety networks have much more stringent service requirements (e.g., reliability and security) and also require direct communication, especially when cellular coverage fails or is not available. This essential direct mode feature is currently missing in LTE.

In some cases, the UE would like to receive both MBMS service and ProSe service simultaneously. However, when the UE cannot support simultaneous reception of both MBMS service and ProSe service, the UE behavior should be defined clearly.

DISCLOSURE OF INVENTION

Technical Problem

The present invention provides a method and apparatus for prioritizing a device-to-device (D2D) reception over a multimedia broadcast multicast service (MBMS) reception in a wireless communication system. The present invention provides a method and apparatus for a prioritizing a MBMS reception over a D2D reception. The present invention provides a method and apparatus for indicating a result of the prioritization.

Solution to Problem

In an aspect, a method for prioritizing, by a user equipment (UE), one of a multimedia broadcast multicast service (MBMS) reception or a device-to-device (D2D) reception in a wireless communication system is provided. The method includes prioritizing one of the MBMS reception or the D2D reception if the UE cannot support both MBMS reception and the D2D reception simultaneously, and indicating a result of the prioritization to the network.

In another aspect, a user equipment (UE) includes a memory, a transceiver, and a processor coupled to the memory and the transceiver, and configured to prioritize one of a multimedia broadcast multicast service (MBMS) reception or a device-to-device (D2D) reception if the UE cannot support both MBMS reception and the D2D reception simultaneously, and control the transceiver to indicate a result of the prioritization to the network.

Advantageous Effects of Invention

When the UE cannot support both MBMS reception D2D reception simultaneously, the UE behavior can be clear.

BRIEF DESCRIPTION OF DRAWINGS

FIG. 1 shows LTE system architecture.

FIG. 2 shows a block diagram of architecture of a typical E-UTRAN and a typical EPC.

FIG. 3 shows a block diagram of a user plane protocol stack of an LTE system.

FIG. 4 shows a block diagram of a control plane protocol stack of an LTE system.

FIG. 5 shows an example of a physical channel structure.

FIG. 6 shows an example of a user plane protocol stack for ProSe direct communication.

FIG. 7 shows an example of PC5 interface for ProSe direct discovery.

FIG. 8 shows an example of prioritizing one of MBMS reception or D2D reception according to an embodiment of the present invention.

FIG. 9 shows a wireless communication system to implement an embodiment of the present invention.

MODE FOR THE INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink LTE-advance (LTE-A) is an evolution of the 3GPP LTE.

For clarity, the following description will focus on the LTE-A. However, technical features of the present invention are not limited thereto.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e. between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or IPv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARM). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Proximity-based services (ProSe) are described. "ProSe" may be used mixed with "D2D". ProSe direct communication means a communication between two or more UEs in proximity that are ProSe-enabled, by means of user plane transmission using E-UTRA technology via a path not traversing any network node. ProSe-enabled UE means a UE that supports ProSe requirements and associated procedures. Unless explicitly stated otherwise, a ProSe-enabled UE refers both to a non-public safety UE and a public safety UE. ProSe-enabled public safety UE means a ProSe-enabled UE that also supports ProSe procedures and capabilities specific to public safety. ProSe-enabled non-public safety UE means a UE that supports ProSe procedures and but not capabilities specific to public safety. ProSe direct discovery means a procedure employed by a ProSe-enabled UE to discover other ProSe-enabled UEs in its vicinity by using only the capabilities of the two UEs with 3GPP LTE rel-12 technology. EPC-level ProSe discovery means a process by which the EPC determines the proximity of two ProSe-enabled UEs and informs them of their proximity. ProSe UE identity (ID) is a unique identity allocated by evolved packet system (EPS) which identifies the ProSe enabled UE. ProSe application ID is an identity identifying application related information for the ProSe enabled UE.

ProSe direct communication is a mode of communication whereby two public safety UEs can communicate with each other directly over the PC5 interface. This communication mode is supported when the UE is served by E-UTRAN and when the UE is outside of E-UTRA coverage. A transmitter UE transmits scheduling assignment (SA) to indicate the resources it is going to use for data transmission to the receiver UEs.

FIG. 6 shows an example of a user plane protocol stack for ProSe direct communication. The UE radio protocol architecture for ProSe direct communication is given for the user plane and the control plane. Referring to FIG. 6, PDCP, RLC and MAC sublayers (terminate at the other UE) perform the functions listed for the user plane, e.g. header compression, HARQ retransmissions. The PC5 interface consists of PDCP, RLC, MAC and PHY.

User plane details of ProSe direct communication is described. There is no HARQ feedback for ProSe direct communication. MAC sub header contains LCIDs to differentiate multiple logical channels. The MAC header comprises a source Layer-2 ID and a destination Layer-2 ID. At MAC multiplexing/de-multiplexing, priority handling and padding are useful for ProSe direct communication. RLC unacknowledged mode (UM) is used for ProSe direct communication. Segmentation and reassembly of RLC service data units (SDUs) are performed. A receiving UE needs to maintain at least one RLC UM entity per transmitting peer UE. An RLC UM receiver entity does not need to be configured prior to reception of the first RLC UM data unit. U-Mode is used for header compression in PDCP for ProSe direct communication.

A UE may establish multiple logical channels. LCID included within the MAC subheader uniquely identifies a logical channel within the scope of one source layer-2 ID and destination Layer-2 ID combination. All logical channels are mapped to one specified logical channel group (e.g. LCGID 3).

For ProSe direct communication, the ProSe-enabled UE can operate in two modes for resource allocation, which include Mode 1 (eNB scheduled resource allocation) and Mode 2 (UE autonomous resource selection). In Mode 1, the UE needs to be RRC_CONNECTED in order to transmit data. The UE requests transmission resources from the eNB. The eNB schedules transmission resources for transmission of scheduling assignment(s) and data. The UE sends a scheduling request (dedicated scheduling request (D-SR) or random access) to the eNB followed by a ProSe BSR. Based on the BSR, the eNB can determine that the UE has data for a ProSe direct communication transmission and estimate the resources needed for transmission. In Mode 2, a UE on its own selects resources from resource pools to transmit scheduling assignment and data.

A UE is considered in-coverage if it has a serving cell (i.e. the UE is RRC_CONNECTED or is camping on a cell in RRC_IDLE). If the UE is out of coverage, it can only use Mode 2. If the UE is in coverage, it may use Mode 1 if the eNB configures it accordingly. If the UE is in coverage, it may use Mode 2 if the eNB configures it accordingly. When there are no exceptional conditions, the UE changes from Mode 1 to Mode 2 or Mode 2 to Mode 1 only if it is configured by eNB to do so. If the UE is in coverage, it shall use only the mode indicated by eNB configuration unless one of the exceptional cases occurs. The UE considers itself to be in exceptional conditions while T311 or T301 is running. When an exceptional case occurs, the UE is allowed to use Mode 2 temporarily even though it was configured to use Mode 1.

A UE that is camped or connected on one carrier frequency but interested in ProSe direct communication operation on another carrier frequency shall attempt to find cells on the ProSe carrier frequency. An RRC_IDLE UE camped on a cell in another carrier frequency, but in the coverage area of an E-UTRA cell on ProSe carrier frequency may reselect to the ProSe carrier frequency once it detects a suitable cell there. An RRC_CONNECTED UE served by a cell in another carrier frequency sends a ProSe direct communication indication to its serving cell when it wants perform ProSe communication. The indication contains the intended ProSe carrier frequency. The serving cell may configure an inter-frequency radio resource management (RRM) measurement on the ProSe carrier frequency and based on the measurement report trigger inter-frequency mobility to the ProSe carrier frequency once the UE enters coverage on a cell on the ProSe carrier frequency. If the UE detects a cell on the ProSe carrier frequency, and if resources on ProSe carrier frequency are not provided by E-UTRAN on the ProSe carrier frequency for ProSe direct communication via SIB or dedicated signalling the UE shall no longer use the ProSe resources preconfigured for that frequency. If the UE does not find an E-UTRA cell on ProSe carrier frequency, the UE can use ProSe carrier frequency resources preconfigured for Mode 2.

For UEs in RRC_IDLE, the eNB may provide a Mode 2 transmission resource pool in system information block (SIB). UEs that are authorized for ProSe direct communication use these resources for ProSe direct communication in RRC_IDLE. Alternatively, the eNB may indicate in SIB that it supports ProSe direct communication but does not provide resources for it. UEs need to enter RRC_CONNECTED to perform ProSe direct communication transmission.

For UEs in RRC_CONNECTED, a UE in RRC_CONNECTED that is authorized to perform ProSe direct communication transmission indicates to the eNB that it wants to perform ProSe direct communication transmissions. The eNB validates whether the UE in RRC_CONNECTED is authorized for ProSe direct communication transmission using the UE context received from MME. The eNB may configure a UE in RRC_CONNECTED by dedicated signaling with a Mode 2 resource allocation transmission resource pool that may be used without constraints while the UE is RRC_CONNECTED. Alternatively, the eNB may configure a UE in RRC_CONNECTED by dedicated signaling with a Mode 2 resource allocation transmission resource pool which the UE is allowed to use only in exceptional cases and rely on Mode 1 otherwise.

The resource pool for scheduling assignment when the UE is out of coverage can be pre-configured for reception and transmission. The resource pool for scheduling assignment when the UE is in coverage can be configured as follows. The resource pool used for reception is configured by the eNB via RRC, in dedicated or broadcast signaling. The resource pool used for transmission is configured by the eNB via RRC if Mode 2 resource allocation is used. The SA resource pool for transmission is not known to the UE if Mode 1 resource allocation is used. The eNB schedules the specific resource(s) to use for scheduling assignment transmission if Mode 1 resource allocation is used. The specific resource assigned by the eNB is within the resource pool for reception of scheduling assignment that is provided to the UE.

In order to perform communication even when some UEs are in-coverage and some UEs are out of coverage, all UEs (i.e. both in and out of coverage) should monitor resource pool for scheduling assignment which is the union of the resource pools used for transmission of scheduling assignment in all (or some of the when in-coverage) cells and transmission of scheduling assignment out of coverage.

ProSe direct discovery is defined as the procedure used by the ProSe-enabled UE to discover other ProSe-enabled UE(s) in its proximity using E-UTRA direct radio signals via PC5. ProSe direct discovery is supported only when the UE is served by E-UTRAN.

FIG. 7 shows an example of PC5 interface for ProSe direct discovery. Referring to FIG. 7, UE A and UE B perform ProSe direct discovery using ProSe protocol via PC5. Upper layer handles authorization for announcement and monitoring of discovery information. Content of discovery information is transparent to AS and no distinction in AS is made for ProSe direct discovery models and types of ProSe direct discovery. The ProSe protocol ensures that it delivers only valid discovery information to AS for announcement. The UE can participate in announcing and monitoring of discovery information in both RRC_IDLE and RRC_CONNECTED state as per eNB configuration. The UE announces and monitors its discovery information subject to the half-duplex constraint. Announcing and monitoring UE maintains the current coordinated universal time (UTC) time. Announcing UE transmits the discovery message which is generated by the ProSe protocol taking into account the UTC time upon transmission of the discovery message. In the monitoring UE, the ProSe protocol provides the message to be verified together with the UTC time upon reception of the message to the ProSe function.

Radio protocol stack (AS) for ProSe direct discovery consists of only MAC and PHY. The AS layer performs interfaces with upper layer (ProSe Protocol). The MAC layer receives the discovery information from the upper layer (ProSe Protocol). The IP layer is not used for transmitting the discovery information. The AS layer also performs scheduling. The MAC layer determines the radio resource to be used for announcing the discovery information received from upper layer. The AS layer also performs discovery PDU generation. The MAC layer builds the MAC PDU carrying the discovery information and sends the MAC PDU to the physical layer for transmission in the determined radio resource. No MAC header is added.

There are two types of resource allocation for discovery information announcement, which include Type 1 and Type 2. Type 1 resource allocation is a resource allocation procedure where resources for announcing of discovery information are allocated on a non UE specific basis. In Type 1, the eNB provides the UE(s) with the resource pool configuration used for announcing of discovery information. The configuration may be signaled in SIB. The UE autonomously selects radio resource(s) from the indicated resource pool and announce discovery information. The UE can announce discovery information on a randomly selected discovery resource during each discovery period. Type 2 resource allocation is a resource allocation procedure where resources for announcing of discovery information are allocated on a UE specific basis. In Type 2, the UE in RRC_CONNECTED may request resource(s) for announcing of discovery information from the eNB via RRC. The eNB assigns resource(s) via RRC. The resources are allocated within the resource pool that is configured in UEs for monitoring.

For UEs in RRC_IDLE, the eNB may provide a Type 1 resource pool for discovery information announcement in SIB. UEs that are authorized for Prose direct discovery use these resources for announcing discovery information in RRC_IDLE. Alternatively, the eNB may indicate in SIB that it supports ProSe direct discovery but does not provide resources for discovery information announcement. UEs need to enter RRC_CONNECTED in order to request resources for discovery information announcement.

For UEs in RRC_CONNECTED, a UE authorized to perform ProSe direct discovery announcement, when it needs to perform ProSe direct discovery announcement, indicates to the eNB that it wants to perform ProSe direct discovery announcement. The eNB validates whether the UE is authorized for ProSe direct discovery announcement using the UE context received from MME. The eNB may configure the UE to use a Type 1 resource pool or dedicated Type 2 resources for discovery information announcement via dedicated RRC signaling (or no resource). The resources allocated by the eNB are valid until a) the eNB de-configures the resource(s) by RRC signaling or b) the UE enters RRC_IDLE.

Receiving UEs in RRC_IDLE and RRC_CONNECTED monitor both Type 1 and Type 2 discovery resource pools as authorized. The eNB provides the resource pool configuration used for discovery information monitoring in SIB. The SIB may contain discovery resources used for announcing in neighbor cells as well.

Synchronous and asynchronous deployments are supported. Discovery resources can be overlapping or non-overlapping across cells. The serving cell may provide in SIB information which neighbor frequencies support ProSe direct discovery. For synchronized, full-overlapping, intra-frequency deployment, the eNB provides just one resource pool (no D2D synchronization signal (D2DSS) information required).

If authorized by the network, the UE can announce ProSe direct discovery information only on serving cell. The UE can monitor discovery resources in intra PLMN in intra and inter-frequency as well as inter-PLMN inter-frequency. Serving cell may provide in SIB a list of frequencies (possibly with the corresponding PLMN ID) on which the UE may aim to monitor ProSe direct discovery information. Serving cell does not provide detailed ProSe discovery configuration for other carrier frequencies. The UE shall read SIB18 and other relevant SIBs on other carriers if it wants to perform ProSe direct discovery information monitoring on those carriers. Obtaining ProSe discovery configuration by reading SIB18 (and other SIBs) of an inter-frequency and/or inter-PLMN cell should not affect the UE's Uu reception on the serving cell(s). Intra-frequency, inter-frequency and inter-PLMN ProSe direct discovery monitoring should not affect Uu reception. The UE uses DRX occasions in RRC_IDLE and RRC_CONNECTED or second reception chain if it is available, for intra-frequency, inter-frequency and inter-PLMN prose direct discovery information monitoring. The UE shall not create autonomous gaps. An RRC_CONNECTED UE sends ProSe discovery indication to the serving cell if it is interested or no longer interested in intra-frequency, inter-frequency or inter-PLMN ProSe discovery information monitoring.

Group communication system enabler (GCSE) (including MBMS feature) and D2D communication may be mainly used for public safety. Thus, there may be the case that a UE may want to receive D2D communication resource pool, while receiving a MBMS service on multicast broadcast single frequency network (MBSFN) subframes (e.g. for public safety service especially). Further, there may be the case that a UE may want to monitor D2D discovery resource pool, while receiving a MBMS service on MBSFN subframes (e.g. for commercial service).

Support of simultaneous reception of both D2D resource and MBMS resources may be discussed in two scenarios, one of which is that D2D resources and MBMS resources are provided on the same cell, and the other is that D2D resources and MBMS resources are provided on different cells.

For the first scenario in which D2D resources and MBMS resources are provided on the same cell, it is likely that UE supporting D2D may be capable of simultaneously receiving both DL resources and UL resources at the same time at a cell. Thus, if this UE also supports MBMS reception on the DL frequency of the cell, the UE would be able to support simultaneous reception of both D2D resources on UL frequency of the cell and MBMS resources on UL frequency of the cell, i.e. for the same cell. As we know, a MBMS capable UE supports MBMS reception on primary cell (PCell) as a basic MBMS capability. However, MBMS reception on secondary cell (SCell) and MBMS reception on non-serving cell are subject to UE capability. Thus, support for simultaneous reception of both D2D resources and MBMS resources at the same cell may be different at least depending on support of MBMS reception on PCell, SCell and non-serving cell as follows.

(1) The UE should support simultaneous reception of both D2D resources and MBMS resources on PCell, if the UE supports both D2D operation and MBMS reception.

(2) The UE should support simultaneous reception of both D2D resources and MBMS resources on the same SCell, if the UE supports MBMS reception on the SCell and D2D operation on the same SCell.

(3) The UE should support simultaneous reception of both D2D resources and MBMS resources on the same non-serving cell, if the UE supports MBMS reception on the non-serving cell and D2D operation on the same non-serving cell.

For the second scenario in which D2D resources and MBMS resources are provided on different cells, the network may possibly provide D2D resources and MBMS resources at different cells on different frequencies. For example, while the UE may camp on the first cell on frequency 1, the network may provide MBMS resources at the second cell on frequency 2, but D2D resources at the third cell on frequency 3. In this case, support for simultaneous reception of both D2D resources and MBMS resources on the different cells may depend on whether or not the UE support combination of the frequencies of those cells. Unfortunately, issue on UE capability related to D2D is not completely solved. Accordingly, whether or not the UE can support simultaneous reception of both D2D resources and MBMS resources at different cells on different frequencies should be further discussed when UE capability related to D2D becomes clear.

However, there seems the case that a certain UE does not support simultaneous reception of both D2D resources and MBMS resources at different cells on different frequencies. For example, the UE camping on the first cell on frequency 1 may support reception of MBMS resources at frequency 2, but may be unable to support reception of D2D resources at the third cell on frequency 3, depending on UE capability. Or, the UE camping on the first cell on frequency 1 may be unable to support reception of MBMS resources at frequency 2, but may support reception of D2D resources at the third cell on frequency 3.

In order to solve the problem described above, a method for prioritizing one of MBMS reception or D2D reception, if the UE cannot support both MBMS reception D2D reception simultaneously, according to an embodiment of the present invention may be proposed. According to an embodiment of the present invention, the UE may select one of D2D reception or MBMS reception between different frequencies, because the UE cannot support simultaneous reception. If the UE prioritizes D2D reception over MBMS reception, it is likely that the UE moves to the frequency where D2D resources are provided. If the UE prioritizes MBMS reception over D2D reception, it is likely that the UE moves to the frequency where MBMS resources are provided. This kind of UE behavior may be similar to prioritization of MBMS reception over unicast reception. Thus, while being in RRC_IDLE, if MBMS reception is prioritized over D2D reception, the UE may prioritize the MBMS frequency according to MBMS service continuity feature. Otherwise, UE may not prioritize the MBMS frequency in cell reselection. That is, if the UE cannot support simultaneous reception of both D2D resources and MBMS resources on different carriers, and if D2D operation is prioritized over MBMS reception, the UE in RRC_IDLE may not prioritize the MBMS frequency in cell reselection while performing D2D reception.

In addition, while being in RRC_CONNECTED, the UE may indicate prioritization of MBMS reception over D2D reception either in MBMSInterestIndication message or a new ProSe indication message while providing the network with UE capability related to MBMS reception and D2D reception. Accordingly, the eNB may properly configure a serving cell for either MBMS reception or D2D reception. For example, while being in RRC_CONNECTED, if MBMS reception is prioritized over D2D reception, the eNB may configure a PCell or SCell on the MBMS frequency depending on UE capability related to MBMS reception. Otherwise, the eNB may configure a serving cell on the ProSe carrier frequency for D2D reception. The UE may be able to have different MBMS priorities for D2D communication and D2D discovery, because use cases of D2D communication and D2D discovery may be different. Further, for example, one UE may be normally used as commercial purpose, so that it may prioritize GCSE/MBMS reception over D2D communication. But, this UE may want to prioritize D2D discovery over MBMS reception because they like to see neighboring discovery announcements nearby. On the other hand, another UE may be normally used as public safety purpose and also talkative (e.g. a leader of a group), so that it may prioritize D2D communication over MBMS reception. But, this UE may want to prioritize MBMS reception over D2D discovery.

Hereinafter, various embodiments according to the present invention are described.

For a first embodiment of the present invention, the UE, which is to receive either MBMS transmissions or D2D transmissions, may prioritize either MBMS reception over D2D reception or D2D reception over MBMS reception, if the UE cannot support both MBMS reception and D2D reception simultaneously. The D2D reception may correspond to either reception of transmissions for D2D communication or reception of D2D discovery announcements. Further, the UE may indicate a result of the prioritization to the network while the UE is in RRC_CONNECTED. The result of the prioritization may indicate either prioritization of MBMS reception over D2D reception or prioritization of D2D reception over MBMS reception. The indication may be transmitted via by MBMS interest indication message or ProSe indication message. The indication may be transmitted via MBMS interest indication message when MBMS reception is prioritized over D2D reception. The indication may be transmitted via ProSe indication message when D2D reception is prioritized over MBMS reception.

For the second embodiment of the present invention, the UE, which is in RRC_CONNECTED and is to receive either MBMS transmissions on a MBMS carrier frequency or D2D transmissions on a ProSe carrier frequency, may prioritize either MBMS reception over D2D reception or D2D reception over MBMS reception, if the UE cannot support both MBMS reception and D2D reception simultaneously. The D2D reception may correspond to either reception of transmissions for D2D communication or reception of D2D discovery announcements. Further, the UE may indicate to the network that the MBMS carrier frequency is interested (via the MBMS interest indication message), if MBMS reception is prioritized over D2D reception as a result of the prioritization. Alternatively, the UE may indicate to the network that no MBMS carrier frequency is interested (via the MBMS interest indication message), if D2D reception is prioritized over MBMS reception as a result of the prioritization.

For the third embodiment of the present invention, the UE, which is in RRC_CONNECTED and is to receive either MBMS transmissions on a MBMS carrier frequency or D2D transmissions on a ProSe carrier frequency, may prioritize either MBMS reception over D2D reception or D2D reception over MBMS reception, if the UE cannot support both MBMS reception and D2D reception simultaneously. The D2D reception may correspond to either reception of transmissions for D2D communication or reception of D2D discovery announcements. Further, the UE may indicate to the network that the ProSe carrier frequency is interested (via the ProSe indication message), if D2D reception is prioritized over MBMS reception as a result of the prioritization. Alternatively, the UE may indicate to the network that no ProSe carrier frequency is interested (via the ProSe indication message), if MBMS reception is prioritized over D2D reception as a result of the prioritization. In this case, the indication may correspond to the ProSe indication message including 'no ProSe carrier frequency'.

For a fourth embodiment of the present invention, the UE, which is to receive either MBMS transmissions or D2D transmissions, may prioritize either MBMS reception over D2D reception or D2D reception over MBMS reception, if the UE cannot support both MBMS reception and D2D reception simultaneously. The D2D reception may correspond to either reception of transmissions for D2D communication or reception of D2D discovery announcements. Further, the UE may consider a MBMS frequency where interested MBMS service is provided as the highest cell reselection priority, if MBMS reception is prioritized over D2D reception as a result of the prioritization. Alternatively, the UE may not consider a MBMS frequency where interested MBMS service is provided as the highest cell reselection priority, if D2D reception is prioritized over MBMS reception.

FIG. 8 shows an example of prioritizing one of MBMS reception or D2D reception according to an embodiment of the present invention.

In step S100, the UE prioritize one of the MBMS reception or the D2D reception if the UE cannot support both MBMS reception and the D2D reception simultaneously. The D2D reception may correspond to either a reception of D2D communication or a reception of D2D discovery announcements. The MBMS reception may be provided on a MBMS carrier frequency, and the D2D reception may be provided on a ProSe carrier frequency. The MBMS carrier frequency and the ProSe carrier frequency may be different from each other.

In step S110, the UE indicates a result of the prioritization to the network. The result of the prioritization may indicate either that the MBMS reception is prioritized over the D2D reception or the D2D reception is prioritized over the MBMS reception. The result of the prioritization may be indicated via a MBMS interest indication message or a ProSe indication message. The result of the prioritization may be indicated via the MBMS interest indication message, when the MBMS reception is prioritized over the D2D reception. The result of the prioritization may be indicated via the ProSe indication message, when the D2D reception is prioritized over the MBMS reception.

Alternatively, the result of the prioritization may indicate that the MBMS carrier frequency is interested, when the MBMS reception is prioritized over the D2D reception. The result of the prioritization may indicate that the MBMS carrier frequency is not interested, when the D2D reception is prioritized over the MBMS reception. The result of the prioritization may indicate that the ProSe carrier frequency is interested, when the D2D reception is prioritized over the MBMS reception. The result of the prioritization may indicate that the ProSe carrier frequency is not interested, when the MBMS reception is prioritized over the D2D reception. The MBMS carrier frequency may be considered as a highest cell reselection priority, when the MBMS reception is prioritized over the D2D reception. The MBMS carrier frequency may not be considered as a highest cell reselection priority, when the D2D reception is prioritized over the MBMS reception.

FIG. 9 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for prioritizing, by a user equipment (UE), one of a multimedia broadcast multicast service (MBMS) reception or a device-to-device (D2D) reception in a wireless communication system, the method comprising:
   prioritizing, by the UE, one of the MBMS reception or the D2D reception when the UE cannot support both the MBMS reception and the D2D reception simultaneously; and
   transmitting, by the UE, a message indicating a result of the prioritization to a network,
   wherein the MBMS reception is provided on a MBMS carrier frequency,
   wherein the D2D reception is provided on a proximity-based services (ProSe) carrier frequency,
   wherein the MBMS carrier frequency is considered as the highest cell reselection priority, when the MBMS reception is prioritized over the D2D reception, and
   wherein the MBMS carrier frequency is not considered as the highest cell reselection priority, when the D2D reception is prioritized over the MBMS reception.

2. The method of claim 1, wherein the result of the prioritization indicates either that the MBMS reception is prioritized over the D2D reception or the D2D reception is prioritized over the MBMS reception.

3. The method of claim 1, wherein the result of the prioritization is indicated via a MBMS interest indication message or a ProSe indication message.

4. The method of claim 3, wherein the result of the prioritization is indicated via the MBMS interest indication message, when the MBMS reception is prioritized over the D2D reception.

5. The method of claim 3, wherein the result of the prioritization is indicated via the ProSe indication message, when the D2D reception is prioritized over the MBMS reception.

6. The method of claim 1, wherein the result of the prioritization indicates that the MBMS carrier frequency is interested, when the MBMS reception is prioritized over the D2D reception.

7. The method of claim 1, wherein the result of the prioritization indicates that the MBMS carrier frequency is not interested, when the D2D reception is prioritized over the MBMS reception.

8. The method of claim 1, wherein the result of the prioritization indicates that the ProSe carrier frequency is interested, when the D2D reception is prioritized over the MBMS reception.

9. The method of claim 1, wherein the result of the prioritization indicates that the ProSe carrier frequency is not interested, when the MBMS reception is prioritized over the D2D reception.

10. The method of claim 1, wherein the MBMS carrier frequency and the ProSe carrier frequency are different from each other.

11. The method of claim 1, wherein the D2D reception corresponds to either a reception of D2D communication or a reception of D2D discovery announcements.

12. A user equipment (UE) comprising:
   a memory;
   a transceiver; and
   a processor coupled to the memory and the transceiver, and configured to:
      prioritize one of a multimedia broadcast multicast service (MBMS) reception or a device-to-device (D2D) reception when the UE cannot support both the MBMS reception and the D2D reception simultaneously, and
      control the transceiver to transmit a message indicating a result of the prioritization to a network,
   wherein the MBMS reception is provided on a MBMS carrier frequency,
   wherein the D2D reception is provided on a proximity-based services (ProSe) carrier frequency,
   wherein the MBMS carrier frequency is considered as the highest cell reselection priority, when the MBMS reception is prioritized over the D2D reception, and
   wherein the MBMS carrier frequency is not considered as the highest cell reselection priority, when the D2D reception is prioritized over the MBMS reception.

* * * * *